Oct. 20, 1936.   W. B. FLANDERS   2,058,143
GLAND
Filed May 29, 1934

WITNESSES:
E. H. Lutz
James K. Mosser

INVENTOR
WARREN B. FLANDERS
BY
ATTORNEY

Patented Oct. 20, 1936

2,058,143

UNITED STATES PATENT OFFICE 2,058,143

GLAND

Warren B. Flanders, Philadelphia, Pa., assignor to Westinghouse Electric & Manufacturing Company, East Pittsburgh, Pa., a corporation of Pennsylvania Application May 29, 1934, Serial No. 728,121

2 Claims. (Cl. 286—7)

My invention relates to glands, such as are used to seal steam turbines, and it has for its object to provide a gland of the carbon ring type of special construction in order to increase durability thereof and to reduce friction.

Heretofore, with glands of the carbon ring type, trouble has been encountered in the usual applications due to wear of the shaft or sleeve thereon, such wear also causing wear of the carbon rings. Corrosion of the surface with which the rings cooperate is also another cause for wear of the rings as well as the shaft. Accordingly, I have devised a gland of the carbon ring type wherein these objections are overcome. Therefore, in accordance with my invention, I provide a gland having carbon rings of the usual type together with modification of the spindle structure to give long life to the carbon rings and to reduce friction. To this end, the spindle member is provided with a cylindrical sheath having an outer truly cylindrical surface which, after being polished, is chromium plated, the chromium plating giving a hard smooth surface, one which cooperates with the carbon rings in such manner as to minimize wear of the latter, and one which provides a bearing contact with the carbon rings having a low coefficient of friction.

This and other objects are effected by my invention, as will be apparent from the following description and claims, taken in connection with the accompanying drawing, forming a part of this application, in which:

Figure 1:
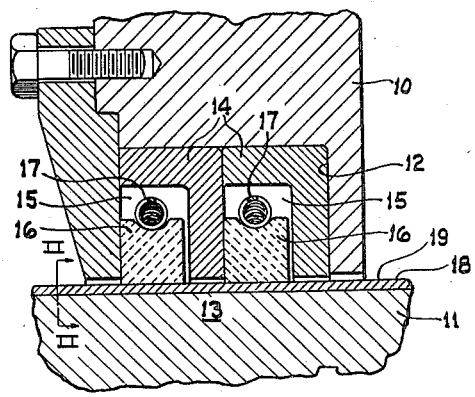
Fig. 1 is a sectional detail view of a gland embodying my improvement.
Figure 2:
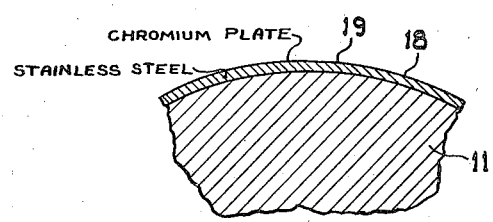
Fig. 2 is a sectional detail view taken along the line II—II of Fig. 1.

Referring now to the drawing, I show a casing or stator element 10 and a spindle element 11, the casing being formed to provide a chamber 12 for the carbon ring packing, at 13.

The carbon ring packing, at 13, is of the usual type, including rings 14 arranged in the chamber 12 and defining spaces 15 for the carbon rings 16 and the garter springs 17, which cause the carbon rings to engage about the rotor element 11 so as to maintain a suitable seal.

The rotor element 11 is provided with a stainless steel sheath 18 having an outer true cylindrical surface which is chromium plated, as indicated at 19. Before the chromium plating is applied, the outer surface of the stainless steel is finished and polished so that a perfectly smooth plated surface may be had. Making the sheath of stainless steel is advantageous in that it is non-corrosive and loosening of the chromium plating is thereby avoided.

The chromium plated sheath cooperates with the carbon rings to secure several advantageous results. First of all, since the stainless steel sheath as well as the chromium plating are non-corrosive, wear of the sheath and of the rings is avoided on that account. Furthermore, the chromium is very hard and smooth so that wear of the carbon rings is thereby greatly minimized and a permanently tight carbon ring gland may therefore be secured. This structure is possessed of another advantage in that chromium plating has a very low coefficient of friction with respect to the rings.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In a gland for sealing a steam turbine where the spindle extends through the casing, a metallic sheath formed separately from the spindle and fixedly secured thereon so that the sheath extends through the casing, said sheath being comprised by rust-proof metal having a polished outer cylindrical surface with a plating of chromium thereon, and one or more carbon rings carried by the casing and cooperating with the plated surface to effect a seal between the spindle and the casing.

2. In a gland for sealing a steam turbine where the spindle extends through the casing, a stainless steel sheath formed separately from the spindle and fixedly secured thereon so that the sheath extends through the casing, said sheath having a polished outer cylindrical surface with a plating of chromium thereon, and one or more carbon rings carried by the casing and cooperating with the plated surface to effect a seal between the spindle and the casing.

WARREN B. FLANDERS.